United States Patent [19]

Redmond et al.

[11] Patent Number: 4,805,938
[45] Date of Patent: Feb. 21, 1989

[54] DEVICE FOR CONNECTING TWO BABY STROLLERS TOGETHER

[76] Inventors: Thomas Redmond; Regina Redmond, both of 2602 Central Ave., Baldwin, N.Y. 11510

[21] Appl. No.: 174,376

[22] Filed: Mar. 28, 1988

[51] Int. Cl.[4] .............................................. B62B 9/12
[52] U.S. Cl. ................................ 280/47.35; 280/209; 280/47.38; 403/188; 24/569; 248/231.6; 248/316.6; 297/248; 297/243
[58] Field of Search ...................... 280/47.38, 203, 204, 280/289 WC, 209, 647, 658; 403/188, 391, 389; 24/265 C, 569, 596; 248/230, 231.6, 316.6; 297/248, 249, 243

[56] References Cited

U.S. PATENT DOCUMENTS

| 772,613 | 10/1904 | Grabe | 403/188 |
|---|---|---|---|
| 1,707,186 | 3/1929 | Chatfield | 280/658 |
| 1,934,396 | 11/1933 | Bales | 297/248 |
| 2,814,455 | 11/1957 | Rainey | 248/316.6 X |
| 3,383,738 | 5/1968 | Fox et al. | 297/248 |
| 3,531,071 | 9/1970 | Kubli | 403/391 X |

FOREIGN PATENT DOCUMENTS

| 1372603 | 8/1964 | France | 24/569 |
| 14142 | of 1898 | United Kingdom | 280/209 |

*Primary Examiner*—Charles A. Marmor
*Assistant Examiner*—Tamara L. Finlay
*Attorney, Agent, or Firm*—Michael I. Kroll

[57] ABSTRACT

A device is provided for connecting two baby strollers together consisting of a pair of bracket units spaced apart and clamped between frames of the baby strollers so that one person can operate the strollers simultaneously for transporting two babies therein.

5 Claims, 1 Drawing Sheet

U.S. Patent  Feb. 21, 1989  4,805,938
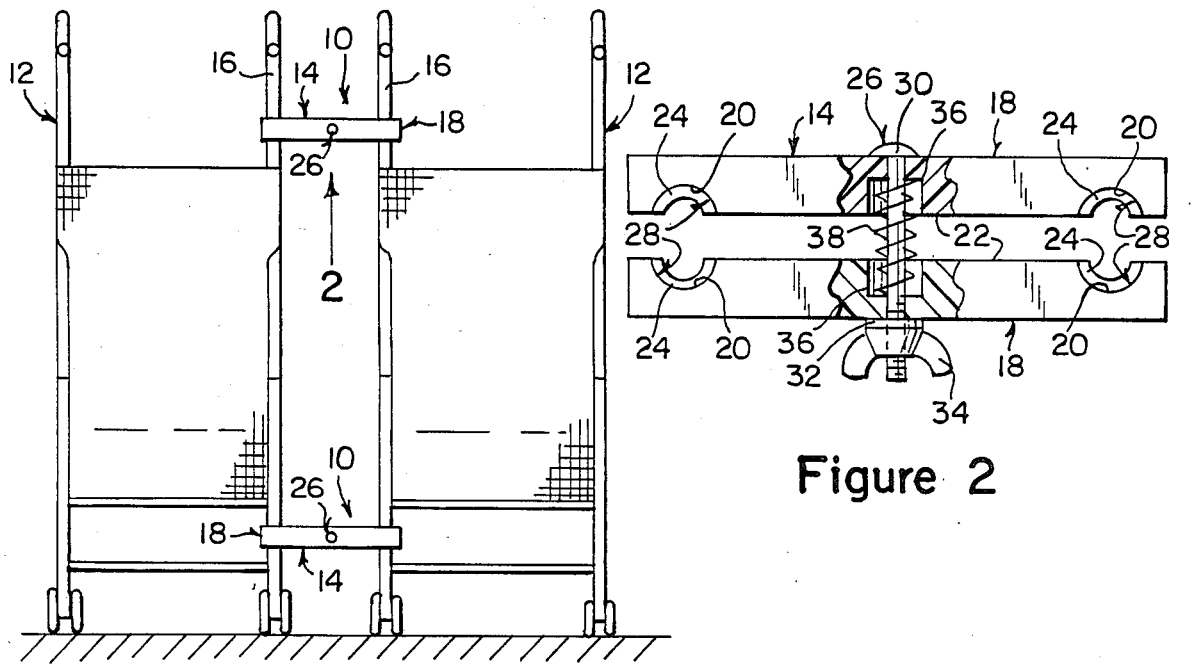
Figure 1
Figure 2
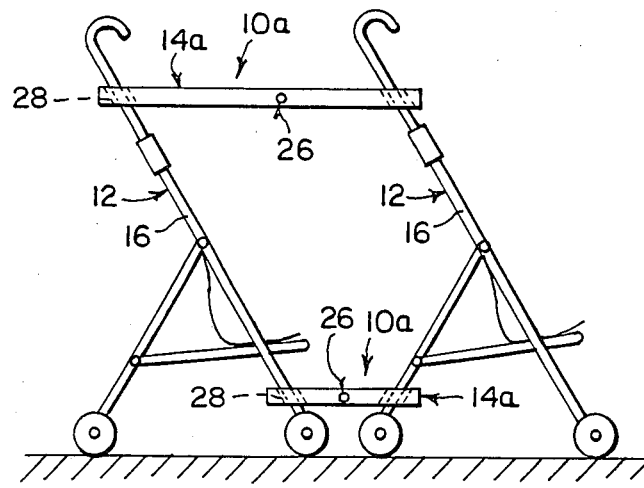
Figure 3
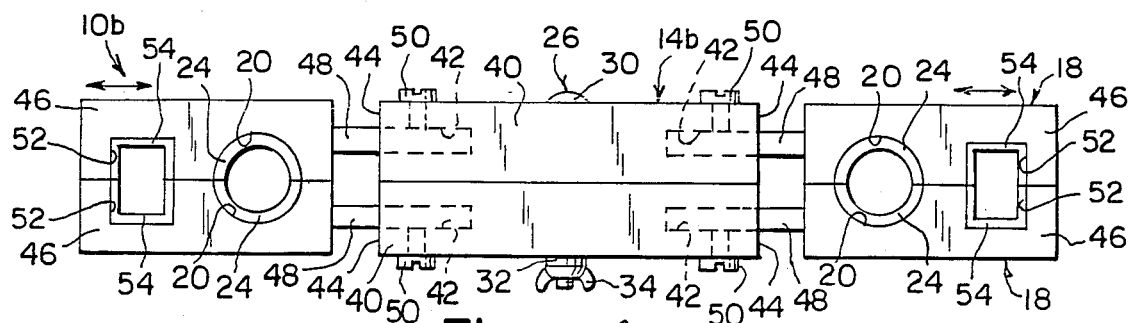
Figure 4

DEVICE FOR CONNECTING TWO BABY STROLLERS TOGETHER

BACKGROUND OF THE INVENTION

1. Field of the Invention

The instant invention relates generally to connectors and more specifically it relates to a device for connecting two baby strollers together.

2. Description of the Prior Art

Numerous connectors have been provided in prior art that are adapted to join, fasten, link or unite articles together. While these units may be suitable for the particular purpose to which they address, they would not be as suitable for the purposes of the present invention as heretofore described.

SUMMARY OF THE INVENTION

A primary object of the present invention is to provide a device for connecting two baby strollers together that will overcome the shortcomings of the prior art devices.

Another object is to provide a device for connecting two baby strollers together so that one person can operate the strollers simultaneously for transporting two babies.

An additional object is to provide a device for connecting two baby strollers together in which the device can be adaptable and adjustable to various types of baby strollers.

A further object is to provide a device for connecting two baby strollers together that is simple and easy to use.

A still further object is to provide a device for connecting two baby strollers together that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, ad that changes may be made in the specific construction illustrated and described within the scope of the appended claims.

BRIEF DESCRIPTION OF THE DRAWING FIGURES

FIG. 1 is a front view of two strollers side by side with the invention installed therebetween.

FIG. 2 is a bottom view with parts broken away as indicated by numeral 2 in FIG. 1 of one of the bracket units.

FIG. 3 is a side view of two strollers one in front of the other with a modification of the invention installed therebetween.

FIG. 4 is a bottom view of another modification of the invention being an adjustable bracket unit being adaptable to fit various types of baby strollers.

DETAILED DESCRIPTION OF THE PREFERRED EMBODIMENTS

Turning now descriptively to the drawings, in which similar reference characters denote similar elements throughout the several views, FIGS. 1 and 2 illustrate a device 10 for connecting two baby strollers 12 together which consists of a pair of bracket units 14 spaced apart and clamped between frames 16 of the baby strollers 12 so that one person (not shown) can operate the strollers 12 simultaneously for transporting two babies (not shown) therein.

Each of the bracket units 14 includes two housing segments 18, each of which has two spaced apart half aperture portions 20 within a mating edge 22 thereof. Padding material 24 is disposed within the half aperture portions 20. A fastener 26 is provided for removably fastening the two housing segments 18 together so that the half aperture portions 20 will come together to form complete apertures 28 in which the padding material 24 can bear against the frames 16 of the baby strollers 12

The fastener 26 includes a bolt 30 extending centrally through the two housing segments 18. A washer 32 fits onto distal end of the bolt 30 and a wing nut 34 is threaded onto the distal end of the bolt 30 to hold the two housing segments 18 together.

Each of the housing segments 18 has a central inwardly extending recess 36 from the mating edge 22 in which the bolt 30 passes therethrough. A spring 38 is disposed onto the bolt 30 between the recesses 36 so that the housing segments 18 will separate when the wing nut 34 is loosened on the bolt 30.

The bracket units 14 are of the same length with the apertures 28 extending at a right angle therethrough so that the strollers 12 can be connected in a side by side relationship.

FIG. 3 shows a first modified device 10a wherein the bracket units 14a are of different lengths with the apertures 28 extending at a slanting angle therethrough so that the strollers 12 can be connected in a one in front of the other relationship.

As best seen in FIG. 2, the apertures 28 are circular in cross section to accommodate circular cross sectional shaped frames 16 of the strollers 12.

FIG. 4 shows a second modified bracket unit 14b in which each of the housing segments 18 includes a stationary middle member 40 having a side square shaped hole 42 at each end 44 and a pair of moving members 46. Each of the moving members 46 has a side square shaped shaft 48 to slideably fit into the respective side square shaped hole 42. A pair of set screws 50 are also provided. Each of the set screws 50 transversely thread into the middle member 40 to the respective hole 42 to bear against the respective shaft 48 for locking the shaft 48 thereto, making the device 10b adjustable to accommodate various types of baby strollers 12.

Each of the moving members 46 has another half aperture portion 52 which is half of a rectangle in cross section, spaced away from the half circular aperture portion 20. Additional padding material 54 is disposed within the rectangular half aperture portion 52 so that when the housing segments 18 are brought together the additional padding material 54 can bear against rectangular cross sectional shaped frames (not shown) of other strollers.

LIST OF REFERENCE NUMBERS 10 device
10a first modified device
10b second modified device
12 baby stroller
14 bracket unit
14a first modified bracket unit
14b second modified bracket unit
16 frame
18 housing segment 20 half aperture portion
22 mating edge
24 padding material
26 fastener
28 complete aperture
30 bolt
32 washer
34 wing nut
36 recess
38 spring
40 stationary middle member
42 side square shaped hole
44 end
46 moving member
48 side square shaped shaft
50 set screw
52 half aperture portion
54 additional padding material It will be understood that each of the elements described above, or two or more together, may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A device for connecting two baby strollers together, comprising:
   (a) a pair of bracket units spaced apart and clamped between frames of the baby strollers so that one person can operate the strollers simultaneously for transporting two babies therein, each of said bracket units including two housing segments each of said segments having two spaced apart half aperture portions within a mating edge thereof and padding material disposed with said half aperture portions an means for removably fastening said two housing segments together so that said half aperture portions will come together to form complete apertures in which said padding material can bear against the frames of the baby strollers, said fastening means including a bolt extending centrally through said two housing segments and a washer to fit onto distal end of said bolt and a wing nut threaded onto the distal end of said bolt to hold said two housing segments coming together, each of said housing segments having a central inwardly extending recess from said mating edge in which said bolt passes therethrough, each of said housing segments in each of said bracket units including a stationary middle member having a side square shaped hole at each end and a pair of moving members each of said moving members having a side square shaped shaft to slideably fit into said respective side square shaped hole and a pair of set screws each of said set screws transversely thread into said middle member to said respective hole to bear against said respective shaft for locking said shaft thereto making said device adjustable to accommodate various types of baby strollers; and
   (b) a spring disposed onto said bolt between said recesses so that said housing segments will separate when said wing nut is loosened on said bolt.

2. A device as recited in claim 1, wherein said bracket units are of same length with said apertures extending at a right angle therethrough so that the strollers can be connected in a side by side relationship.

3. A device as recited in claim 1, wherein said bracket units are of different lengths with sai apertures extending at a slanting angle therethrough so that the strollers can be connected in a one in front of the other relationship.

4. A device as recited in claim 1, wherein said apertures are circular in cross section to accommodate circular cross sectional shaped frames of the strollers.

5. A device as recited in claim 1, further including:
   (a) each of said moving members having another half aperture portion which is half of a rectangle in cross section, spaced away from said half circular aperture portion; and
   (b) additional padding material disposed within said rectangular half aperture portion so that when said housing segments are brought together said additional padding material can bear against rectangular cross sectional shaped frames of other strollers.

* * * * *